United States Patent Office 3,484,611
Patented Dec. 16, 1969

3,484,611
INFRARED DETECTOR COMPOSED OF A SINTERED BODY OF VANADIUM PENTOXIDE AND VANADIUM OXIDE
Hisao Futaki, Tokyo-to, Japan, assignor to Kabushiki Kaisha Hitachi Seisakusho, Tokyo-to, Japan, a joint-stock company
Continuation-in-part of application Ser. No. 339,954, Jan. 24, 1964. This application May 16, 1967, Ser. No. 646,134
Int. Cl. G01j 5/20
U.S. Cl. 250—83.3        2 Claims

ABSTRACT OF THE DISCLOSURE

An infrared radiation detector comprising a thin film of 1 to a number of microns thick of a sintered body composed of $V_2O_5$ and at least one metal oxide, wherein $VO_2$ (or $V_2O_4$) is dispersed in the form of fine crystals. The device has its point of actuation within a temperature range where the resistance-temperature characteristics of $VO_2$ (or $V_2O_4$) abruptly vary.

This application is a continuation-in-part of prior application Ser. No. 339,954, filed on Jan. 24, 1964, in the name of Hisao Futaki, and entitled "Infrared Radiation Detector."

This invention relates to infrared radiation detectors which comprises an infrared radiation detection element having small time-constant made of a sintered body composed of $V_2O_5$ and at least one metal oxide which surrounds fine crystals of $VO_2$ (or $V_2O_4$) dispersed therein, which is formed into a thin film of 1 to a number of microns thick.

Among the devices used heretofore as infrared radiation detectors, there are, as indicated in the accompanying Table 1, the thermocouple type detectors (Ref. 1); the metal wire detectors (Ref. 2); the thermistor bolometer (Ref. 3); the Goley detector (Ref. 4); and the photoconductive cells (Ref. 5).

More specifically, the invention contemplates overcoming the difficulty due to a limit to infrared sensitivity, the said limit arising from the magnitude of the coefficient of resistance variation with respect to temperature variation in the case of a conventional thermistor element, and overcoming the disadvantage of large time constant arising from the large heat capacity of the element caused by the difficulty of forming the thin film of the thermistor.

Figure 1:
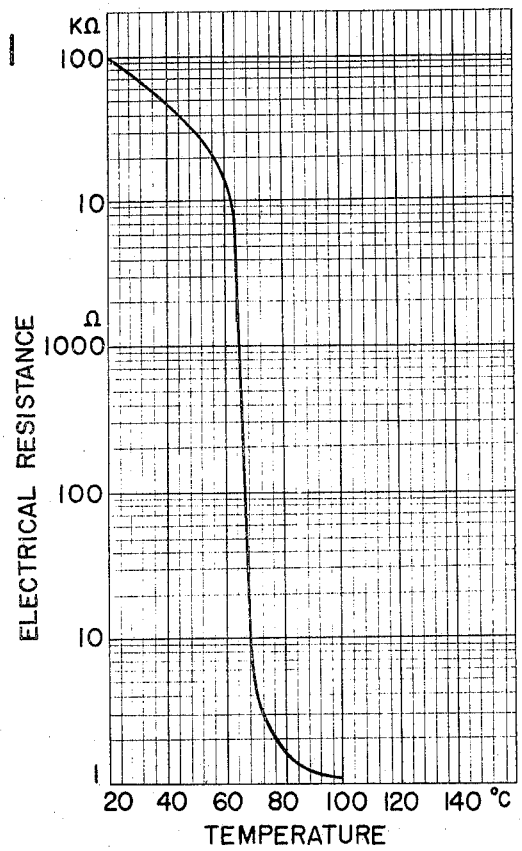
Figure 2:
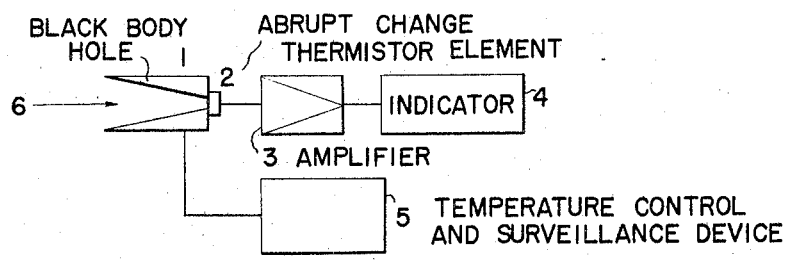

The nature and details of the invention will be more clearly apparent by reference to the following description when taken in conjunction with the accompanying drawing in which:

FIG. 1 is a graphical representation, with a logarithmic ordinate scale, indicating a characteristic curve of an abrupt change thermistor; and FIG. 2 is a block diagram indicating a preferred embodiment of the infrared radiation detector according to the invention.

It has been found that a thermistor element with highly desirable characteristics, which makes possible the achievement of the aforestated object and other objects and advantages of the invention, can be produced by a procedure which comprises: adding to vanadium oxide as the main ingredient a basic metal oxide and an acidic oxide; causing the mixture so formed to melt and react at a temperature in the vicinity of the melting point of the said mixture to produce a glass-like product; forming from this product a thin film of a thickness of from 1 to a number of microns; heat treating this film at a temperature of from 500 to 900 degrees C. in a reductive atmosphere; leaving this film once to cool naturally; then calcining the film within a short time in a reducing flame.

The thin film obtained in this manner is a sort of sintered body, in which fine crystals of $VO_2$ (or $V_2O_4$) surrounded with sintered body of $V_2O_5$ and at least one metal oxide is dispersed. Owing to existence of $VO_2$ (or $V_2O_4$), the resistance-temperature characteristics of the sintered body indicate variations as shown in FIG. 1, i.e., when the temperature increases by about 10° C. from the point of 65° C., the electric resistance of the sintered body

TABLE 1

| Detector Type | Impedance | Time Constant (sec.) | Sensitivity (volt/watt) | Detection Wavelength Region ($\mu$) |
|---|---|---|---|---|
| Reference No.: | | | | |
| 1. Thermocouple type detector | | $9 \times 10^{-2}$ | 90 | Ultraviolet to infrared. |
| 2. Metal wire detector | | $4 \sim 3.5 \times 10^{-3}$ | $15 \sim 100$ | Do. |
| 3. Conventional thermistor bolometer | $3 \times 10^6$ | $3.5 \sim 30 \times 10^{-3}$ | $550 \sim 1,200$ | Do. |
| 4. Goley detector | | $0.6 \times 10^{-3}$ | | Far infrared. |
| 5. Photo-conductive cell, cadmium sulfide | $1.5 \times 10^6$ | $10^{-3} \sim 10^{-3}$ | $1,000 \sim 150,000$ | $1 \sim 8\mu$. |
| 6. Infrared radiation detector of the present invention | $3 \times 10^6$ | $0.5 \sim 5 \times 10^{-3}$ | $10,000 \sim 150,000$ | $1 \sim 8\mu$. |

From Table 1, it is to be observed that the thermistor bolometer (Ref. 3), relative to the detectors (Refs. 1, 2, and 4), has the following characteristics.
(1) 10 to 100 times higher sensibility.
(2) High impedance, wherefore direct coupling to a vacuum tube amplifier circuit is possible.
(3) Frequency-independent sensitivity over the wide wavelength region of from ultraviolet to infrared.
(4) High mechanical strength.

Because of these desirable characteristics and other reasons, the conventional thermistor bolometer is recently beginning to be widely used. This thermistor bolometer, however, is inferior to photo-conductive cells such as those of the cadmium sulfide type in that its sensitivity is lower, being of the order of from $10^{-1}$ ot $10^{-2}$ time of that of the latter, and also in that its time constant is higher, being of the order of 100 times that of the latter.

It is an object of the present invention to improve thermistor bolometers with respect to the above stated disadvantages.

abruptly decreases by $10^2$–$10^4$. This sintered body will be called herein after as "abrupt changing thermistor." In order to obtain favorable temperature-resistance characteristics of the thermistor, it is preferable that $VO_2$ (or $V_2O_4$) be contained in the above oxide semiconductor at the rate of 5 mol percent. The content less than that will cause decrease in the degree of variation in the electric resistance. Accordingly, in the abovestated reducing process, the reduction should be continued until vanadium pentoxide will have been converted to sufficient amount of $VO_2$ (or $V_2O_4$). Also, the size of the abovementioned $VO_2$ (or $V_2O_4$) fine crystals should be controlled as small as possible, preferably, less than a few microns. If the size of the $VO_3$ fine crystals is unnecessarily large, a hysteresis phenomenon (a phenomenon, wherein the locus of variations in electric resistance values when the temperature is increased does not become coincident with that when temperature is decreased) inevitably appears on the resistance-temperature characteristics, and, moreover, the characteristics incline to be deteriorated with lapse of operating time.

For obtaining a thin film of such sintered body, it is better to subject the oxide semiconductor under heat right after the sinter-treatment to rapid cooling.

$VO_2$ and other oxides which have been mixed together become molten by heat in the course of the reducing process, and fine crystals of $VO_2$ is deposited out of the molten mixture. The heating temperature at this time should be less than the melting point of $VO_2$ (or $V_2O_4$). After the cooling, the mixture is to surround the $VO_2$ fine crystals, connect them mutually and electrically, and prevent them from being deteriorated in their electrical characteristics with lapse of time affected by the external atmosphere.

It has heretofore been known that resistance value of $VO_2$ (or $V_2O_4$) crystals indicate abrupt change in its negative resistance within a specific temperature range as is the case with the thermister as described above. However, the thermistor element composed of a single crystal of $VO_2$ has not been put into practical use for the reasons that $VO_2$ crystal itself directly contacts air to change its electrical characteristics, hence deterioration therein with lapse of time is remarkable, and that the size of the crystal is large enough to bring about the abovementioned undesirable hysteresis phenomenon, on account of which the resistance-temperature characteristics thereof could not be sufficiently taken advantage of.

The temperature range, within which the resistance value of the abovementioned oxide semiconductor changes abruptly, is from 60° C. to 75° C. An oxide semiconductor which is principally composed of vanadium oxide and whose resistance value abruptly change below 60° C. or above 75° C. has already been disclosed in our co-pending application Ser. No. 475,129, filed July 27, 1965, now Patent No. 3,402,131, dated Sept. 17, 1968. According to this application, at least one element of Ge, Fe, Co, Ni, Mn, Ti, Nb, W, Mo, Ta, and Cr is introduced into the fine crystals of vanadium oxide in the state of diffusion or solid-solution. This latter oxide semiconductor is mixed with the abovementioned other oxides, or, instead, the oxides of the abovementioned elements are mixed with vanadium pentoxide, and is then heat-treated at a temperature above the melting point (or softening point) of the mixture, but below the melting point of $VO_2$ (or $V_2O_4$) crystals. In case the abovementioned germanium and titanium are contained in the fine crystals obtained from the molten mixture of $V_2O_5$ and the said oxide, the temperature range within which the electric resistance value abruptly changes becomes higher than that in case no Ge and Ti are contained. On the other hand, when Fe, Co, Ni, Mu, Nb, W, Mo, Cr and/or Ta are contained, the above temperature range becomes lower than that in case they are not contained.

It has been found, further, that when a bolometer of a thickness of from 1 to a number of microns is made from such an abrupt-change thermistor element, with the temperature range producing this abrupt resistance decrease as its operational temperature range, the bolometer exhibits characteristics such as those of Ref. 6 in Table 1. From Table 1, it will be apparent that the infrared radiation detector produced in the above described manner according to the invention has a time constant which is from ⅕ to ¹⁄₁₀ of that of a conventional thermistor bolometer, a sensitivity which is 30 times higher and is independent of frequency in the wide frequency band of from ultraviolet to infrared, and high impedance.

The above described thermistor is used in the infrared radiation detector according to the present invention as illustrated in FIG. 2, which is a basic circuit diagram of an abrupt-change thermistor bolometer in which an abrupt-change thermistor element is used, and which comprises a black body hole 1, an abrupt-change thermistor element 2 connected to the black body hole 1, an amplifier 3, an indicator 4, and a temperature control and surveillance device 5, and a chopper 6 which is an intermittent input light beam and directed toward the detector.

During the operation of the above described bolometer, the black body hole 1 is heated (by means not shown) so that the abrupt-change thermistor is at a temperature in the vicinity of the temperature range of its abrupt resistance change, and the control and surveillance of this temperature is accomplished by the temperature control and surveillance device 5, thereby to maintain the said temperature constant. Since the abrupt-change thermistor 2 is caused to be at this temperature region of its abrupt resistance change, when the effect of an external phenomenon such as to cause an infinitesimal temperature variation therein is imparted thereto, its resistance value is caused by even this slight temperature variation to change substantially. Accordingly, the unbalanced current of the thermistor varies in accordance with the intensity of the incident light and is indicated or recorded by the indicator 4. Since the temperature coefficient of this abrupt-change thermistor is high, the sensitivity of the said thermistor is 30 or more times higher than that of an ordinary thermistor and is from 1,000 to 10,000 or more times higher than that of a thermocouple type detector. For this reason, it is possible to simplify the amplifier 3.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What is claimed is:

1. An infrared radiation detector comprising a bolometer element of an oxide semiconductor composed of a sintered body of vanadium pentoxide $V_2O_5$ and at least one metal oxide wherein fine crystals of vanadium oxide $VO_2$ are scattered; means operable to maintain the temperature of said oxide semiconductor constituting said bolometer element at a definite point within the temperature range at which the resistance-temperature characteristics of said oxide semiconductor abruptly decrease; means operative to project intermittently infrared rays to be detected, into said bolometer element; and means actuatable to detect electric current flowing through said bolometer element.

2. An infrared radiation detector comprising a bolometer element of an oxide semiconductor composed of a sintered body of vanadium pentoxide $V_2O_5$ and at least one metal oxide wherein there are scattered fine crystals of vanadium oxide $VO_2$, at least one element selected from the group consisting of germanium, iron, cobalt, nickel, molybdenum, titanium, niobium, tungsten, tantalum and chromium introduced into said fine crystals of vanadium oxide in solid-solution; means operable to maintain the temperature of said bolometer element at a definite point within the temperature range at which the temperature-versus-electrical resistance characteristics of said bolometer element abruptly decreases; means operative to project intermittently infrared rays, to be detected, into said bolometer; and means actuatable to detect electric current flowing through said bolometer element.

References Cited

UNITED STATES PATENTS

| | | | |
|---|---|---|---|
| 2,700,720 | 1/1955 | Torok | 338—22 |
| 3,250,849 | 5/1966 | Cox et al. | 252—518 X |
| 3,275,572 | 9/1966 | Ruben | 252—518 |

ARCHIE R. BORCHELT, Primary Examiner

U.S. Cl. X.R.

250—211; 252—518; 338—18